Aug. 19, 1924.
J. D. LARSON
1,505,268
STEREOPHOTOMICROGRAPHIC INSTRUMENT
Filed May 28, 1923
2 Sheets-Sheet 1
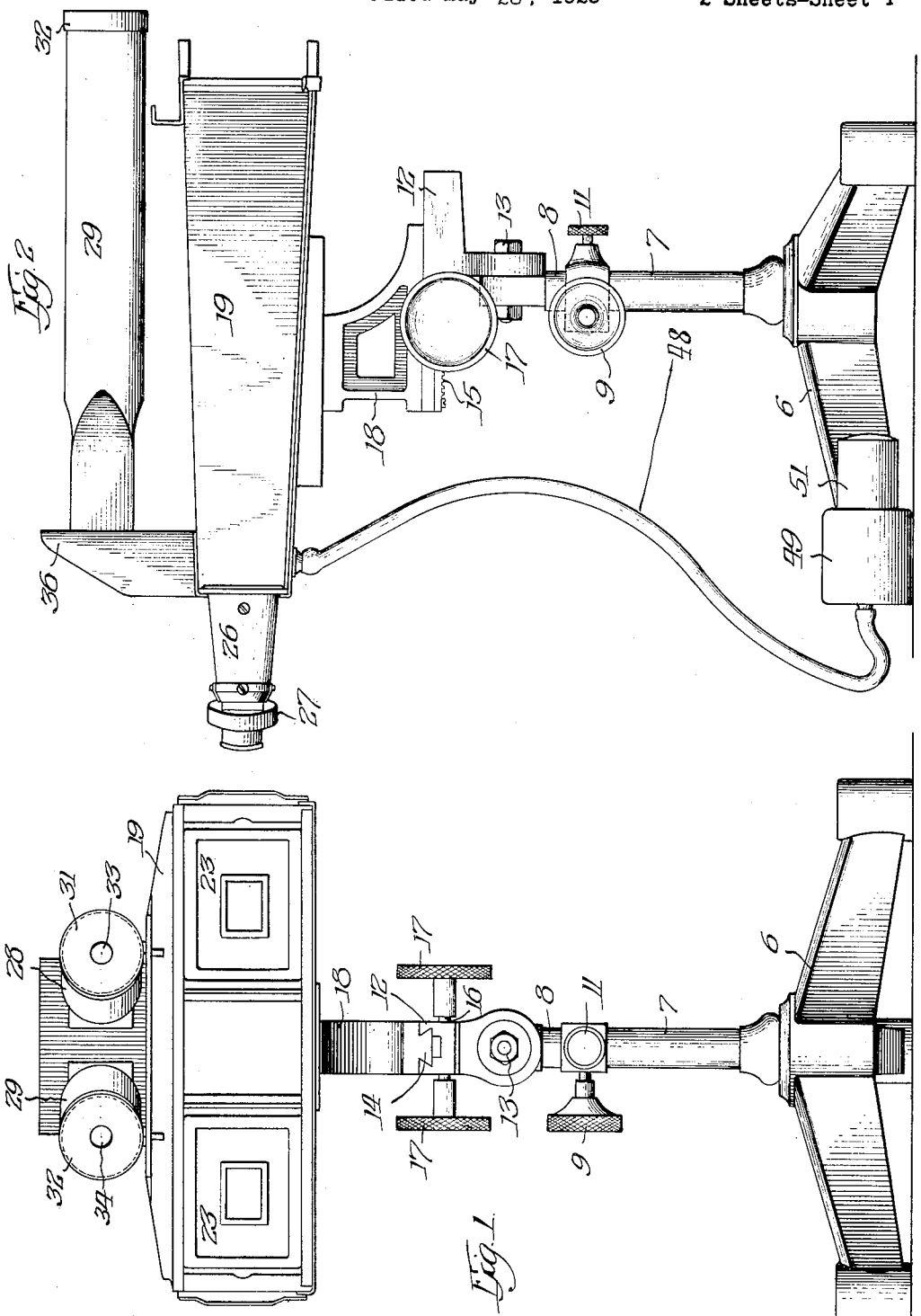

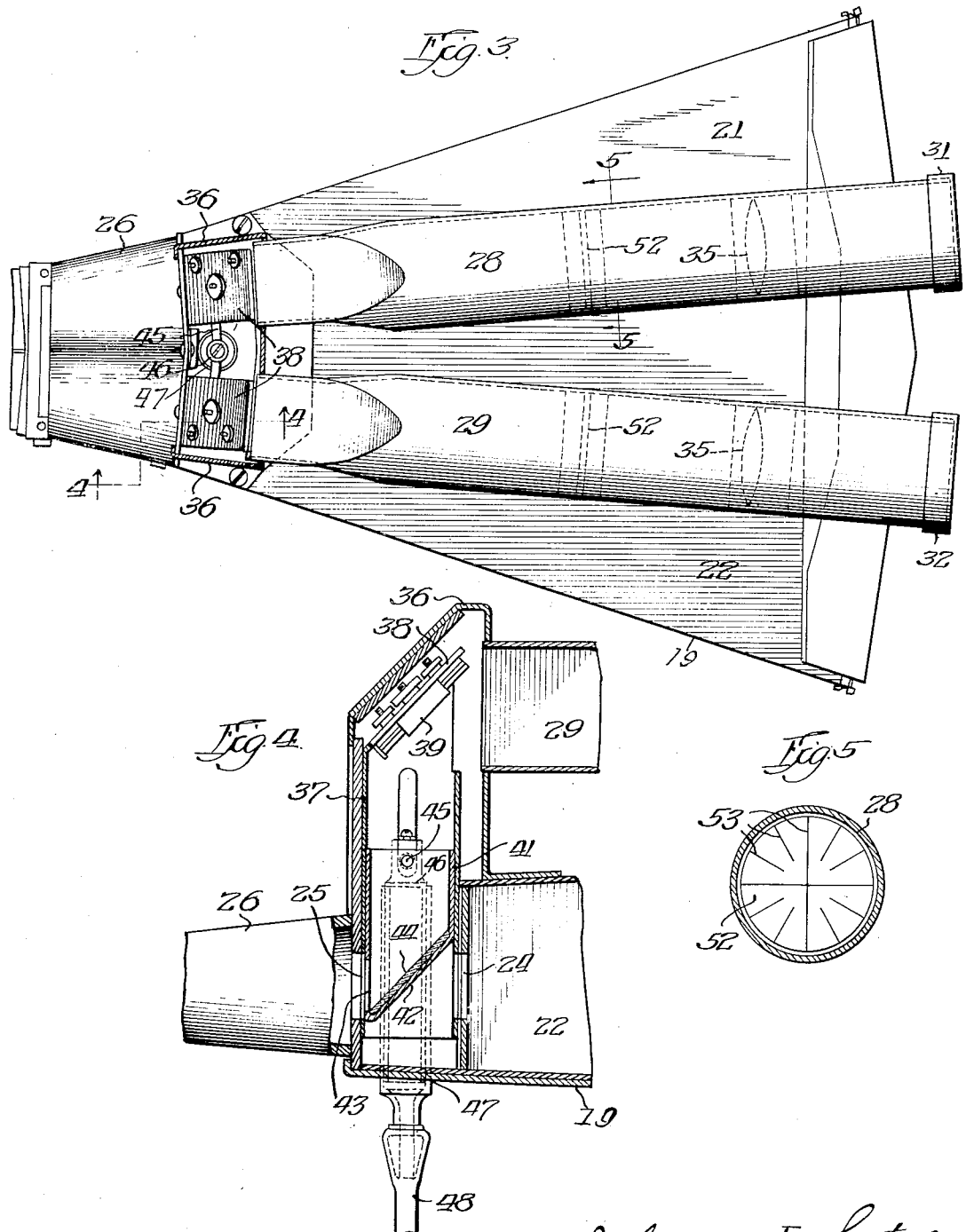

Patented Aug. 19, 1924.

1,505,268

UNITED STATES PATENT OFFICE.

JOHN DAVID LARSON, OF HINSDALE, ILLINOIS.

STEREOPHOTOMICROGRAPHIC INSTRUMENT.

Application filed May 28, 1923. Serial No. 641,887.

*To all whom it may concern:*

Be it known that I, JOHN DAVID LARSON, a citizen of the United States, residing at Hinsdale, in the county of Du Page and State of Illinois, have invented certain new and useful Improvements in Stereophotomicrographic Instruments, of which the following is a specification.

This invention aims to provide an instrument adapted for use by iridologists and other scientists for the purpose of stereoscopically and microscopically examining the iris of the eye, or other objects or specimens which it may be desirable to so examine, and for producing stereo-microphotographs of the same.

While stereo-microphotographic cameras have heretofore been employed for photographing the iris and other objects and specimens, it was necessary in their use for the operator to focus the instrument by peering through the compartments of the camera box itself, from which the plates were necessarily removed in order to permit observation through the box of the object to be photographed. When the desired focus had been obtained, the operator then inserted the photographic plates into the box and the picture was then taken. It very frequently happened, however, that the insertion of the plates into the camera resulted in disturbing the position of the camera so as to impair, if not destroy, the focus; and furthermore, when the iris of an eye or other movable object was being photographed, the eye or such other object was very apt to move between the time that the proper focus was obtained and the picture was taken, with the result that the focus in such cases also would be impaired or destroyed.

My present invention is designed to obviate the inaccuracies resulting from the use of cameras of this general character heretofore employed by providing an instrument which performs the double function of a camera and an instrument of observation. With this end in view, my invention embodies a stereo-photomicrograph camera, and in conjunction therewith a pair of stereo-telescope tubes through which the object to be photographed may be stereoscopically and microscopically observed while the proper and accurate focus of the instrument is being obtained, whereupon the exposure may be instantaneously made, thus obviating the danger of disturbance of the focus by movement of either the camera or the object being photographed.

Another object of the invention is to provide a novel shutter by which the light is normally excluded from the camera compartments, the shutter being equipped with a reflector, which, in conjunction with a companion reflector, serves as a periscope, enabling the object to be inspected and examined through the telescope tubes, and when the exposure is to be made, the shutter is actuated, admitting light to the camera compartments and at the same time momentarily shutting off the view through the tubes.

For the purpose of facilitating an understanding of my invention, I have illustrated on the accompanying drawings a preferred embodiment thereof, from an inspection of which, when considered in connection with the following description, my invention and many of its inherent advantages should be readily understood and appreciated.

Referring to the drawings:

Fig. 1 is a rear elevation of an instrument embodying my invention;

Fig. 2 is a side elevation thereof;

Fig. 3 is a plan view with the upper portion of the shutter compartment broken away;

Fig. 4 is a vertical sectional view taken on the line 4—4 of Fig. 3; and

Fig. 5 is a sectional view on the line 5—5 of Fig. 3.

By reference to the drawings more in detail, it will be observed that the instrument is mounted upon a base 6 carrying a hollow standard 7, in which is telescopically disposed a post 8 adapted to be vertically adjusted in the standard by manipulation of a hand-wheel 9, the parts being locked in vertically adjusted position by a set screw 11.

Upon the upper end of the post 8 a bracket 12 is mounted so as to be capable of angular adjustment about a clamping bolt 13. The bracket is provided with a guideway in which a rack bar 14 provided with rack teeth 15 is horizontally adjustable. A shaft 16, equipped with a pinion (not shown) meshing with the rack teeth 15, is adapted to be turned by means of a handwheel 17 for adjusting the rack forwardly and rearwardly. A support 18, extending upwardly from the rack, has fixedly mounted thereon the camera box, indicated generally by reference character 19.

This camera box is divided into two elongated compartments 21 and 22, provided at their rear ends with suitable grooves or guideways adapted to receive the photographic plate or sensitized film holders 23. These plates or film holders are slid into the position shown in Fig. 1 so as to close the rear ends of the compartments in the usual manner.

The forward ends of the compartments 21 and 22 communicate through openings 24 and 25 with the tubular members 26, each of which is equipped at its forward end with a magnifying lens mounted in a suitable detachable holder 27, these holders being set at an angle so that both lenses will focus upon an iris or other object or specimen to be examined or photographed.

Above the camera box there is mounted a pair of telescope tubes 28 and 29, which extend rearwardly over the box with their rear ends disposed in suitable position to accommodate the two eyes of an observer, the rear ends of the tubes being closed by caps 31 and 32, equipped with sight-openings 33 and 34. A focusing lens 35 is mounted in each tube, and each camera box compartment is equipped with the usual focusing lens (not shown).

The forward end of each telescope tube communicates with the interior of a shutter compartment 36, and in this compartment there is disposed a pair of tubular guide members 37 provided with the openings 24 and 25, previously described. Each tubular member 37 is provided at its upper end with a holder 38, in which is adjustably mounted a reflector 39, which, when properly adjusted, is disposed at an angle of forty-five degrees with respect to the axes of its telescope tube and tubular member 37.

Within each tubular member 37 there is slidably disposed a shutter 41 having an inclined bottom 42 adapted to shut off communication between the openings 24 and 25, and provided near its lower end with an opening 43 establishing communication between the interior of the member 37 and its respective member 26. A second reflector 44 is mounted within each member 37 at an angle of 45 degrees to the axis thereof, so that light entering through the member 26 will be reflected upwardly through the member 37, and thence by a reflector 39 into its respective telescope tube. The two shutters 41 are connected by a crosshead 45 with the upper end of a piston 46, slidably disposed in a cylinder 47, the lower end of which is connected through a nose or flexible tube 48 with a pneumatic actuator 49, including a manually operable plunger 51, depression of which will force air through the tube 48 into the cylinder 47, raising the piston 46 to thereby lift the shutters.

Normally the parts are in the position shown in Fig. 4, from which it will be observed that communication between the microscopic lens at the front of the instrument and the camera box compartments is shut off by the shutters 42. Light entering the instrument through the microscopic lenses will be deflected upwardly by the reflectors 44, and thence by the reflectors 39 into the telescope tubes 28 and 29, through which the object upon which the microscopic lenses are focused may be observed through the sight-openings 33 and 34. The observer may, by means of the various adjustments previously described, adjust the instrument relatively to the object so as to attain the proper focus. Having previously loaded the camera compartments with plates or a sensitized film, he may when the proper focus has been obtained immediately make an exposure by simply pressing inwardly upon the plunger 51. This actuation of the plunger causes the shutters to be raised, as previously explained, thereby permitting the projection of the image through the openings 25 and 24 into the camera compartments, where it is recorded on the plates or sensitized film. The raising or opening of the shutters momentarily, of course, shuts off the view through the telescope tubes, but this is of no moment since it is not essential that the object be under inspection at the exact instant that the exposure is made. The instrument, however, enables the observer to make an exposure and secure a stereoscopic picture immediately after the proper focus upon the object has been attained, and consequently, the liability of an improper focus resulting from either movement of the instrument or movement of the object during the period heretofore required to load the camera with the plates after it had been focused, is obviated. Much more accurate pictures can therefore be attained than has heretofore been possible with cameras of this general character.

In addition to its function of a camera, the present instrument serves also as an examining instrument, since the object may be microscopically and stereoscopically examined without using the camera mechanism, if it be so desired. To render the instrument particularly useful to iridologists and others who require a plotting or charting of the object being observed, I have equipped each of the tubes 28 and 29 with a glass disk 52, provided with radial crosslines or graduations 53, which assist the observer in locating various sectors of the iris.

My invention provides, therefore, both an examining instrument and a camera by means of which an object may be stereoscopically and microscopically examined, and stereoscopically and microscopically photographed. The construction is such that the photographic exposure may be made immediately after the proper focus has been obtained, and any liability of impairment of the focus is obviated.

It is believed that my invention, its construction and mode of operation, and many of its inherent advantages should be understood from the foregoing without further description, and while I have shown and described a preferred embodiment thereof, the structural details thereof may obviously be modified within considerable limits without departing from the essence of the invention, as defined in the following claims.

I claim:

1. In an instrument of the character described, the combination of a pair of microscopic lenses, a camera box providing a compartment for each lens, a plate holder for each compartment, a pair of telescope tubes adapted to communicate with their respective lenses, and means for establishing communication between the lenses and said tubes or between the lenses and said compartments at will.

2. In an instrument of the character described, the combination of a camera box providing a pair of compartments, a plate holder for each compartment, a pair of optical telescope tubes mounted in proximity to said camera box, a pair of microscopic lenses, and manually controlled means whereby an image from said lens may be projected to said tubes or to said compartments at will.

3. In an instrument of the character described, the combination of a camera box providing a pair of compartments, a plate holder for each compartment, a pair of optical telescope tubes, a pair of microscopic lenses, a shutter interposed between said lenses and said compartments, and means including a reflector carried by said shutter for rendering an object upon which said lenses are focused visible through said tubes.

4. In an instrument of the character described, the combination of a camera box, a pair of optical telescope tubes, a pair of microscopic lenses, a pair of vertically disposed tubular members positioned between said lenses and said camera box and provided with openings through which light from the lenses may enter said camera box, a shutter member slidably disposed in each tubular member and adapted to shut off communication between each lens and its respective compartment of the camera box, a reflector carried by each shutter member a reflector carried by each shutter member in position to reflect light upwardly through the tubular member when the shutter is closed, and a reflector at the top of each tubular member adapted to reflect said light into said telescope tubes.

5. In an instrument of the character described, the combination of a pair of microscopic lenses, a pair of camera box compartments, a pair of telescope tubes, a shutter interposed between said lenses and said compartments, a reflector carried by said shutter, a stationary reflector at the end of each telescope tube, and means for operating said shutter.

6. In an instrument of the character described, the combination of a pair of telescope tubes, a pair of lenses, a camera box, a shutter disposed between the lenses and said camera box, a pair of reflectors carried by said shutter, a pair of reflectors disposed in alignment with said tubes, said reflectors being adapted to render visible through said tubes an object upon which said lenses are focused, and means for actuating said shutter to admit light to the camera box through said lenses and simultaneously shut off communication between the lenses and the tubes.

7. In an instrument of the character described, the combination of a photomicrographic camera including a shutter, a pair of stereoscope tubes, means including stationary reflectors in alignment with said tubes and reflectors carried by the shutter, whereby light communication is established between the tubes and the microscopic lenses, and means for actuating said shutter.

8. In an instrument of the character described, the combination of a photomicrographic camera, including a shutter, a pair of optical stereoscope tubes, and periscopic means including stationary reflectors and reflectors mounted on said shutter, whereby an object upon which said camera is focused may be observed through said tubes.

9. In an instrument of the character described, the combination of a stereo-photomicrographic camera including a shutter, a pair of optical stereoscope tubes, a transparent disk provided with graduating marks mounted in each tube, reflectors arranged between the microscopic lenses of the camera and said tubes to permit observation through said tubes of an object upon which the lenses are focused, and means for actuating said shutter.

JOHN DAVID LARSON.